United States Patent [19]
Willmann

[11] Patent Number: 5,188,435
[45] Date of Patent: Feb. 23, 1993

[54] HYDRAULIC ANTI-LOCK MULTICIRCUIT BRAKE SYSTEM, FOR MOTOR VEHICLES

[75] Inventor: Karl-Heinz Willmann, Freiberg/N, Fed. Rep. of Germany

[73] Assignee: Robert Bosch GmbH, Stuttgart, Fed. Rep. of Germany

[21] Appl. No.: 760,783

[22] Filed: Sep. 16, 1991

[30] Foreign Application Priority Data

Oct. 26, 1990 [DE] Fed. Rep. of Germany ....... 4034112

[51] Int. Cl.$^5$ ................................................ B60T 8/34
[52] U.S. Cl. ............................................... 303/113.2
[58] Field of Search ............. 303/92, 113 R, 113 TR, 303/113 TB, 116 R, 116 SP, 119 R

[56] References Cited

U.S. PATENT DOCUMENTS

| | | |
|---|---|---|
| 4,636,009 | 1/1987 | Tsuru et al. ................. 303/116 R X |
| 4,824,183 | 4/1989 | Uchida et al. ............... 303/116 R X |

FOREIGN PATENT DOCUMENTS

| | | |
|---|---|---|
| 0156323 | 10/1985 | European Pat. Off. |
| 1924565 | 11/1970 | Fed. Rep. of Germany |
| 2352284 | 4/1975 | Fed. Rep. of Germany |
| 3440541 | 5/1986 | Fed. Rep. of Germany |
| 3742173 | 6/1989 | Fed. Rep. of Germany |
| 2230068 | 10/1990 | United Kingdom ......... 303/113 TR |
| 2242489 | 10/1991 | United Kingdom ......... 303/113 TR |

*Primary Examiner*—Robert J. Oberleitner
*Assistant Examiner*—Lee W. Young
*Attorney, Agent, or Firm*—Edwin E. Greigg; Ronald E. Greigg

[57] ABSTRACT

A hydraulic brake system for motor vehicles equipped with an anti-lock and traction control device and with brake pressure reduction at the rear axle. The brake system has valve assemblies for brake pressure modulation, which are associated with brake lines, and a pump for pumping pressure fluid, drawn from wheel brakes, into a brake line. A bypass line beginning at the brake line and leading to the wheel brakes of the rear axle is equipped with spring-loaded check valves. On the inlet side, the pump is connected to the bypass line for aspirating pressure fluid from a master brake cylinder. On the inlet and outlet sides of the pump, there is one multiposition valve each in the bypass line and in the brake line, with switching positions for opening and blocking the applicable line. The two multiposition valves are in the open position when without current, while multiposition valves of the valve assemblies disposed toward the wheel brakes in the brake lines are switched to the blocking position when without current. The brake system is particularly suitable for motor vehicles, such as passenger cars and light utility vehicles.

3 Claims, 2 Drawing Sheets

HYDRAULIC ANTI-LOCK MULTICIRCUIT BRAKE SYSTEM, FOR MOTOR VEHICLES

BACKGROUND OF THE INVENTION

The invention is based on a hydraulic anti-lock multicircuit brake system as defined hereinafter.

An anti-lock brake system of this kind is already known (German Offenlegungsschrift 37 42 173, FIG. 1), in which a relatively expensive brake pressure reducer, with which the brake pressure in the rear axle circuit can be reduced compared with the brake pressure in the front axle circuit beyond a pre-determined pressure level, is disposed in the brake circuit of the rear axle. Extending parallel to the brake pressure reducer is a bypass line having a multiposition valve for opening and closing that line. The electromagnetically switchable multiposition valve opens the bypass line whenever and as long as the brake pedal of the brake system is actuated, so that the brake pressure reducer cannot become operative. Brake pressure fed in by the master brake cylinder is therefore operative to its full magnitude in both the brake circuit in the front axle and the brake circuit of the rear axle. If in braking, the wheels of the rear axle threaten to lock, then the anti-lock control system of the brake system regulates the brake pressure at the wheel brakes of these rear wheels downward, so that there is no further tendency to locking and the stability of the vehicle is maintained. In a malfunction, such as a failure of the anti-lock control system, contrarily, the multiposition valve remains in the currentless state and blocks the bypass line. The communication from the master brake cylinder to the wheel brakes of the rear wheels is now via the brake pressure reducer. Not only is this known brake system expensive in design, but it also has less operational reliability, because the multiposition valve in the bypass line is under severe thermal strain if braking persists for relatively long periods.

A brake system is also known having an electronically controlled brake booster (German Offenlegungsschrift 34 40 541), which has an electromagnetically actuable multiposition valve in the brake line leading to the wheel brakes of the rear wheels; in the currentless state, this multiposition valve blocks the brake line. To control the distribution of braking force to the front axle and rear axle, the multiposition valve is switched over to the open position for certain periods of time as a function of the wheel rotation behavior, which is detected with the aid of sensors. Connected parallel to the multiposition valve is a valve assembly by way of which, if the multiposition valve or the energy supply fails or if the electronics malfunction, and so forth, brake pressure reaches the rear wheel brakes, this pressure being adapted to the minimum brake pressure as a function of the particular deceleration, given an ideal brake force distribution. For the purpose of brake force distribution, the embodiment of this brake distribution is also very complicated.

OBJECT AND SUMMARY OF THE INVENTION

The multicircuit brake system according to the invention has the advantage over the prior art that not only the anti-lock control but also traction control and a reduction of brake pressure to the rear axle wheel brakes that is operative if the anti-lock control fails are attained, and the expenditure for this is extraordinarily low. With the version according to the invention, a completely adequate brake pressure distribution to the wheel brakes of the front and rear axles of the vehicle is attained for the case where, despite the very high protection against failure of the anti-lock and traction control devices, pressure fluid must be fed into the wheel brakes of the rear brakes of the rear axle via the bypass line. The values recited herein have proven to be generally adequate to attain stable vehicle operation during braking without locking of the rear axle wheels.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
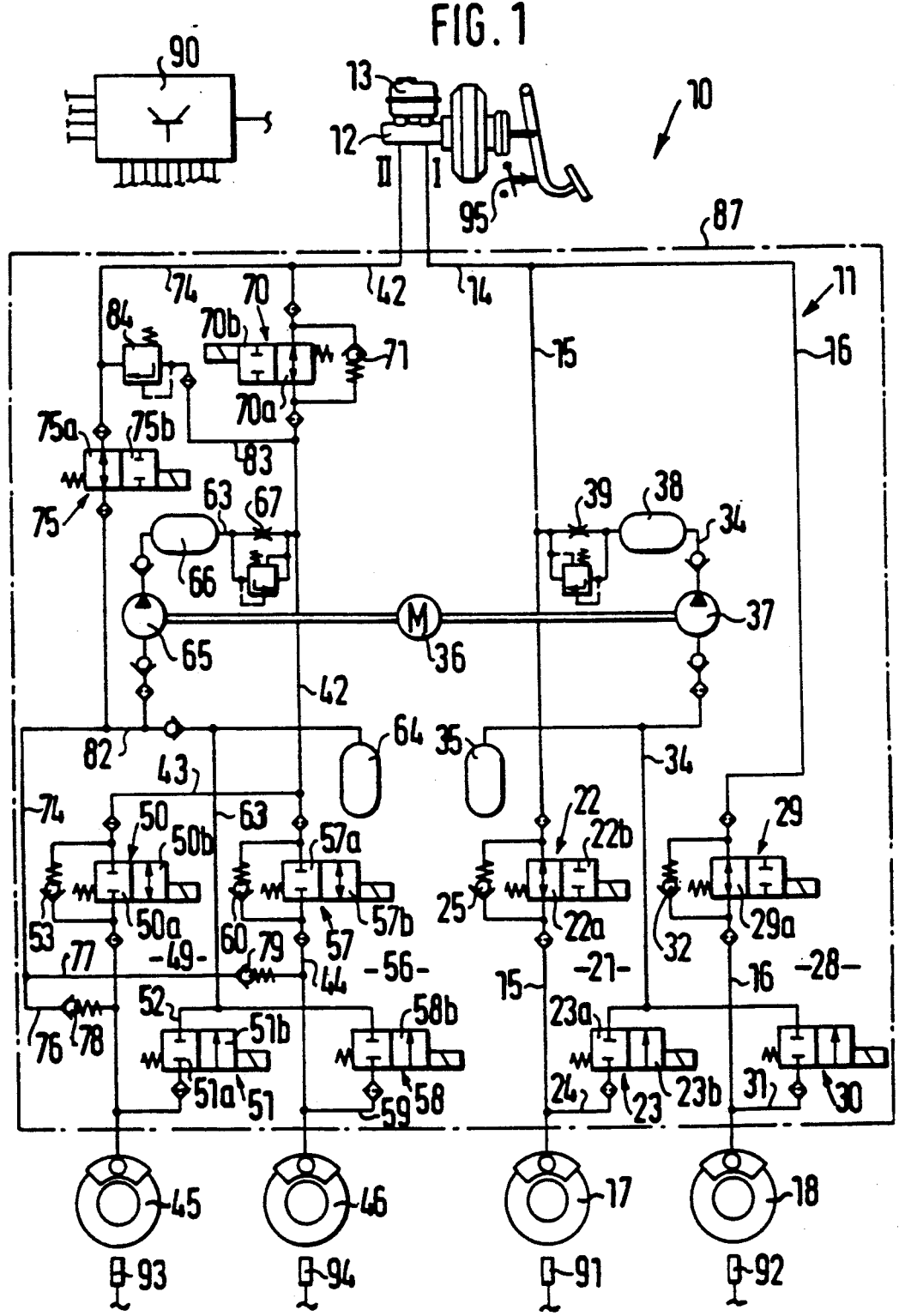
FIG. 1 is a circuit diagram of a hydraulic multicircuit brake system having an anti-lock and traction control device and a valve assembly that reduces brake pressure at the driven rear axle, with brake circuit distribution axle by axle, and FIG. 2, a circuit diagram corresponding to FIG. 1, but with the front axle being driven and with diagonal distribution of the brake circuits.

The first exemplary embodiment shown in FIG. 1 relates to a hydraulic multicircuit brake system 10 for motor vehicles having an anti-lock and traction control device 11. The brake system 10 has a pedal-actuable master brake cylinder 12 with a pressure fluid supply tank 13. A brake line 14 of a brake circuit I begins at the master brake cylinder 12 and is split into two brake lines 15 and 16. Brake lines 15 and 16 lead to the two wheel brakes 17 and 18 of the non-driven front axle of the vehicle.

A valve assembly 21, which comprises a multiposition valve 22 disposed in the brake line 15 and a multiposition valve 23 in a return line 24 is associated with the wheel brake 17. The multiposition valve 22 has two switching positions: a spring-actuated open position 22a and an electromagnetically actuable blocking position 22b. A brake tripping one-way valve 25 is disposed parallel to the multiposition valve 22. The multiposition valve 23 likewise has two switching positions: a spring-actuated blocking position 23a and an electromagnetically switchable open position 23b. The multiposition valves 22 and 23 of the valve assembly 21 serve to modulate brake pressure: a brake pressure buildup in the wheel brake 17 is possible in switching positions 22a and 23a, while pressure holding is possible in the positions 22b and 23a and a pressure reduction in positions 22b and 23b.

A valve assembly 28 having a multiposition valve 29 in the brake line 16 and a multiposition valve 30 in a return line 31 is also associated with the wheel brake 18. A brake tripping one-way valve 32 is also connected parallel to the multiposition valve 29 in the brake line. The multiposition valves 29 and 30 of the valve assembly 28 have the same positions as the valve assembly 21 and the brake line 15; they serve in the same way to modulate brake pressure.

The return lines 24 and 31 beginning at the brake lines 15 and 16, respectively, between the multiposition valves 22 and 29 and the respective wheel brakes 17 and 18 are united in a return line 34 to which a reservoir chamber 35 is connected. Downstream of the reservoir chamber 35 and a return line 34, there is a pump 37 that can be driven by an electric drive motor 36. A damper chamber 38 and a bypassable throttle 39 are located in the return line 34 downstream of the pump 37. Downstream of the throttle 39, the return line 34 is connected to the brake line 15 between the multiposition valve 22 and the master brake cylinder 12.

Also beginning at the master brake cylinder 12 is a brake line 42 of a brake circuit II, which splits into two brake lines 43 and 44. Brake line 43 leads to a wheel brake 45 and brake line 44 leads to a wheel brake 46 of a driven rear axle of the vehicle.

A valve assembly 49 that comprises a multiposition valve 50 disposed in the brake line 43 and a multiposition valve 51 that is located in a return line 52 is associated with the wheel brake 45. The multiposition valve 50 has a spring-actuated blocking position 50a and an electromagnetically switchable open position 50b. The multiposition valve 51 likewise has a spring-actuated blocking position 51a and an electromagnetically switchable open position 51b. A brake tripping one-way valve 53 is disposed in the brake line 43 parallel to the multiposition valve 50. The multiposition valves 50 and 51 of the valve assembly 49 also serve the purpose of brake pressure modulation; in switching positions 50b and 51a, a brake pressure buildup is possible in the wheel brake 45, while in the switching positions 50a and 51a, pressure holding and in switching positions 50a and 51b pressure reduction in wheel brake 45 are possible.

A valve assembly 56 is likewise associated with the wheel brake 46 and in the same way as the valve assembly 49 comprises a multiposition valve 57 in the brake line 44 and a multiposition valve 58 in a return line 59. A brake tripping one-way valve 60 is connected parallel to the multiposition valve 57 in the brake line 44. The multiposition valves 57 and 58 of the valve assembly 56 again have the purpose of modulating the brake pressure in the wheel brake 46.

The return lines 52 and 59 originating at the brake lines 43 and 44 between the multiposition valves 50 and 57 and the wheel brakes 45 and 46 are united in a return line 63 that is connected to the brake line 42. A reservoir chamber 64 communicates with the return line 63. Essentially disposed downstream of the reservoir chamber 64 in the return line 63 are a pump 65, a damper chamber 66 and a bypassable throttle 67. The pump 65, which is embodied as self-aspirating, can be likewise be driven by the drive motor 36.

A multiposition valve 70 with a parallel-connected one-way bypass valve 71 is disposed in the brake line 42 between the master brake cylinder 12 and the connection of the return line 63. The multiposition valve 70 has a spring-actuated open position 70a and an electromagnetically switchable blocking position 70b.

A bypass line 74 extending parallel to the brake line begins at the brake line 42 between the master brake cylinder 12 and the multiposition valve 70. Disposed in the bypass line 74 is a multiposition valve 75 having one spring-actuated or in other words currentless open position 75a and one electromagnetically switchable blocking position 75b. The bypass line 74 is split into two line branches 76 and 77. The bypass line 74 ends with its line branch 76 between the multiposition valve 50 and the wheel brake 45 at the brake line 43 and with its line branch 77 between the multiposition valve 57 and the wheel brake 46 at the brake line 45. Both in the line branch 76 and the line branch 77, the bypass line 74 has a respective spring-loaded one-way check valve 78 and 79. The check valves 78 and 79 have an open direction from the master brake cylinder 12 to the respective wheel brake 45 or 46; they open at a spring-force-dependent response pressure of 20 bar, for instance, and serve as a valve assembly that reduces brake pressure at the wheel brakes 45 and 46 of the driven rear axle.

The self-aspirating pump 65 and the return line 63 communicates on the inlet side with the bypass line 74 by means of an intake line 82 between the multiposition valve 75 and the check valves 78, 79. On the outlet side of the pump 65, an overflow line 83 begins at the brake line 42 between the connection of the return line 63 and the multiposition valve 70; a valve 84 that limits the pressure of the pump 65 is disposed in this overflow line 83. The overflow line 83 ends in the bypass line 74 between the master brake cylinder 12 and the multiposition valve 75.

The anti-lock and traction control device 11, the mechanical elements of which are combined in a hydraulic unit 87 indicated with dot-dash lines, includes an electronic control unit 90, in which signals from rpm sensors 91 through 94 that monitor the rotational behavior of the vehicle wheels can be evaluated. The control unit 90 can also receive signals from a pedal-actuable brake light switch 95. The control unit 90 switches the drive motor 36 of the pumps 37 and 65, the multiposition valves 22, 23, 29, 30 in brake circuit 1, and multiposition valves 50, 51, 57, 58, 70, 75 in brake circuit II in accordance with a specified control algorithm.

The mode of operation of the brake system 10 is as follows:

Beginning at the position of the valves 22, 23, 29, 30 in brake circuit I shown in FIG. 1, brake pressure is fed through the brake lines 14, 15 and 16 into the wheel brakes 17 and 18 of the front axle upon a driver-tripped braking by actuation of the master brake cylinder 12.

In brake circuit II, the valves 50, 51, 57, 58, 70 and 75 also assume the position shown prior to onset of braking. By actuation of the brake light switch 95, the electronic control unit 90 switches the multiposition valves 50 and 57 in brake lines 43 and 44 out of the currentless blocking positions 50a and 57a, respectively, into the open positions 50b and 57b. The control unit 90 can also switch the multiposition valve 75 over from the currentless open position 75a to the blocking position 75b. The brake pressure generated in the master brake cylinder 12 can now become operative through the brake lines 42, 43 and 44 in the wheel brakes 45 and 46 of the driven rear axle.

The switchover of the multiposition valves 50, 57 and possibly 75 can also be done independently of the brake light switch 95, since the control unit 90 recognizes the initiation of braking from the signals of the rpm sensors 91 and 92 on the front axle. As long as the vehicle deceleration does not increase during braking, the multiposition valves 50 and 57 can be switched back into their currentless blocking positions 50a and 57a, to keep their thermal burden low.

At the end of a braking event, the wheel brakes 17, 18 of the front axle are relieved toward the master brake cylinder 12 by the multiposition valves 22 and 29 in the brake circuit I that assume their open positions 22a and 29a. In the brake circuit II, the control unit 90 switches the multiposition valves 50 and 57 into their open positions 50b and 57b to relieve the wheel brakes 45 and 46.

In the multicircuit brake system 10 according to the invention, the rear axle of the vehicle is braked in the same way as the front axle. If in such a braking event, however, the wheels of the rear axle come to slip extensively, or in other words if the wheels threaten to lock, the control unit 90 recognizes this from the signals of the rpm sensors 93 and 94. The control unit 90 then initiates the brake pressure modulation at the wheel brakes 45 and 46 of the rear axle. To this end, the control unit 90 switches the multiposition valves 50 and 57 in the brake lines 43 and 44 into the blocking position 50a and 57a and switches the multiposition valves 51 and 58 in the return lines 52 and 59 into their open position 51b and 58b. During such anti-lock control, the control unit 90 also switches the multiposition valve 75 in the bypass line 74 into the blocking position 75b. At the same time, the control unit 90 switches the drive motor 36 on. In this phase of pressure reduction in the wheel brakes 45 and 46, pressure fluid can flow through the return line 63 into the reservoir chamber 64 or to the self-aspirating pump 65, which pumps it back into the brake line 42. The phase of pressure reduction is adjoined by phases for pressure holding and pressure buildup in the wheel brakes 45 and 46, until stable rotational behavior of the wheels of the rear axle is attained. At the end of an anti-lock control operation, the control unit 90 switches the drive motor 36 off, after the evacuation of the reservoir chamber 64.

If one or both wheels of the front axle threaten to lock, the brake pressure in the wheel brakes 17 and 18 is modulated in a corresponding manner by switching the valve assemblies 21 and 28 and by using the pump 37.

Contrarily, if upon startup and acceleration of the vehicle, the wheel of the driven rear axle associated with the wheel brake 45, for example, encounters unallowably high slip, then the control unit 90 switches the multiposition valve 70 in the brake line 42 into the blocking position 70b and the multiposition valve 50 in the brake line 43 into the open position 50b, while the multiposition valve 75 in the bypass line 74 remains in the open position 75a. The control unit 90 also switches the drive motor 36 on, so that the self-aspirating pump 65 can aspirate pressure fluid from the pressure fluid supply tank 13 through the unactuated master brake cylinder 12, the brake line 42, the bypass line 74 and the intake line 82 and can pump it into the wheel brake 45 through the line 63, the brake line 42 and the brake line 43. Pressure fluid pumping into the wheel brake 46 does not occur in this process, because the multiposition valve 57 assumes its currentless blocking position 57a. Such a brake pressure buildup phase in the wheel brake 45 is followed by phases for pressure holding and pressure buildup for the sake of brake pressure modulation, until the vehicle wheel associated with the wheel brake 45 exhibits a stable rotational behavior. After the conclusion of the traction control operation, the control unit 90 switches the valves into their position shown and switches off the drive motor 36.

As noted, the multiposition valves 50 and 57 assume their blocking positions 50a and 57a in the currentless state. In order that the wheel brakes 45 and 46 will be completely relieved between braking events, the control unit 90 switches the multiposition valves 50 and 57 into their open positions 50b and 57b at predetermined time intervals.

If the anti-lock and traction control device 11, the electronic control unit 90 or the electric power supply fails, the multiposition valves 50 and 57 remain in their positions 50a and 57a that block the brake lines 43 and 44. Despite blocked brake lines 43 and 44 in brake circuit II, brake pressure is fed into the wheel brakes 45 and 46 upon an actuation of the master brake cylinder 12 as well, specifically through the brake line 42, the bypass line 74 having the multiposition valve 75 that is open when without current and through the check valves 78 and 79 into the bypass line branches 76 and 77, as long as the brake pressure exceeds the response pressure of these check valves. The brake pressure fed into the wheel brakes 45 and 46 is therefore lower, by the response pressure of the one-way check valves 78 and 79, than the brake pressure operative in brake circuit I at the wheel brakes 17 and 18. The brake pressure, which is thus operative at a lower level in the rear axle than in the front axle, prevents premature locking of the rear axle wheel brakes 45 and 46 in the great majority of braking instances, so that the vehicle continues to handle in stable fashion. Despite the blocking multiposition valves 50 and 57, unbraking of the wheel brakes 45 and 46 is also possible, specifically via the brake tripping one-way valves 53 and 60.

Figure 2:
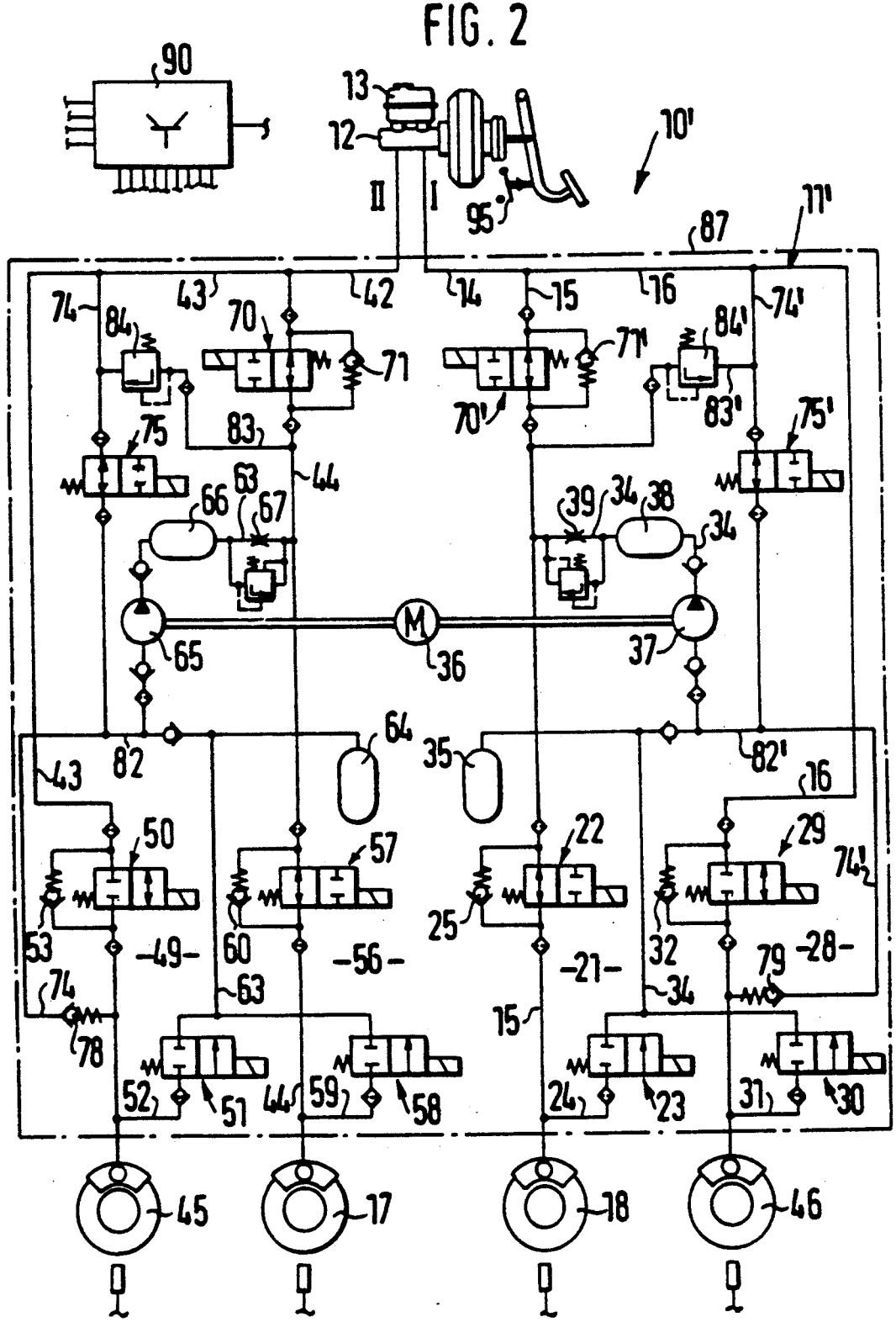

In the second exemplary embodiment, shown in FIG. 2, of the hydraulic multicircuit brake system 10', the reference numerals used for the preceding exemplary embodiment are used for the same elements.

The brake system 10', which in terms of its circuitry is largely identical to the embodiment of FIG. 1, again has two brake circuits I and II. In brake circuit I, however, the wheel brake 18 of a driven front wheel is connected to the brake line 15, and the wheel brake 46 of a non-driven rear wheel is connected to the brake line 16. In brake circuit II, contrarily, the brake line 42 already splits upstream of the multiposition valve 70. Accordingly the multiposition valve 70 following the split is located in the brake line 44, which communicates with the wheel brake 17 of the second driven front wheel. As in the exemplary embodiment of FIG. 1, the brake line 43 communicates with the wheel brake 45 of the second non-driven rear wheel. The vehicle wheels of the front and rear axles associated with the respective brake circuits I and II are diagonally opposed to one another.

A multiposition valve 70', which is fully equivalent to the multiposition valve 70 of brake circuit II and has a parallel-connected bypass valve 71', is disposed in the brake line 15 of brake circuit I, between the master brake cylinder 12 and the connection of the return line 34. In brake circuit I, the pump 37 in the return line 34 is also embodied as self-aspirating. On the inlet side, the pump 37 communicates via an intake line 82' with a bypass line 74' extending parallel to the brake line 16 and bypassing the multiposition valve 29 of the valve assembly 28. The bypass line 74', beginning from the brake line 16 downstream of the split of the brake lines 15 and 16, has a multiposition valve 75', which is equivalent to the one in the bypass line 74 of brake circuit II. An overflow line 83' is connected between the multiposition valve 75' and the connection toward the master brake cylinder of the bypass line 74' to the brake line 16. A pressure limiting valve 84' is disposed in the overflow line 83'. The overflow line 83' ends at the brake line 15 between the multiposition valve 70' and the connection of the return line 34. The bypass line 74' ends between the multiposition valve 29 and the wheel brake 46 at the brake line 16 Between the multiposition valve 75' and its connection toward the wheel brake to the brake line 16, the bypass line 74' has the spring-loaded check valve 79, as a brake pressure reducing valve assembly, associated with the wheel brake 46.

In brake circuit II, the bypass line 74 begins at the brake line 43 after the split of the two brake lines 43 and 44. As in the exemplary embodiment of FIG. 1, the bypass line 74 includes the multiposition valve 75, and upstream of its connection located between the multiposition valve and the wheel brake 45 to the brake line 43 it has the spring-loaded check valve 78 as a brake pressure reducing valve assembly. Otherwise, brake circuits I and II of this exemplary embodiment are equipped as in the exemplary embodiment of FIG. 1.

In the same way as in the exemplary embodiment of FIG. 1, the brake system 10' enables anti-locking control at all vehicle wheels. Traction control operation is equally possible at the wheel brakes 17 and 18 associated with the driven vehicle wheels. In this process, brake pressure is generated in the wheel brake 18 associated with brake circuit I by the pump 37 and in the wheel brake 17 associated with the brake circuit II by the pump 65. Furthermore, in the event of the aforementioned malfunctions or failure of the anti-lock and traction control device 11', brake pressure at a reduced level compared to the front axle brakes 17 and 18 can be fed into the wheel brakes 45 and 46 of the rear axle wheels by the master brake cylinder 12, through the bypass lines 74 and 74' via the check valves 78 and 79.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic anti-lock multicircuit brake system, for motor vehicles having a front and rear axle which comprises;
    a pedal-actuable master brake cylinder (12);
    a brake line (42, 43) extending between the master brake cylinder (12) and at least one wheel brake (45) of the rear axle;
    an electromagnetically actable first multiposition valve (50) disposed in the brake line (42, 43), for brake pressure modulation with switching positions for opening and blocking fluid flow;
    a brake-tripping one-way valve (53) is connected in parallel to the first multiposition valve (50);
    a bypass line (74) extending parallel to the brake line (42, 43) is connected to the brake line (42, 43) at the side of the master brake cylinder (12);
    an electromagnetically actuable second multiposition valve (75) disposed in the bypass line (74) and having switching positions for opening and blocking fluid flow;
    said bypass line (74) terminates at the brake line (42, 43) between the first multiposition valve (50) and the wheel brake (45) and has a spring-loaded one-way check valve (78), disposed between the second multiposition valve (75) and the wheel brake (45) of the rear axle, as a brake pressure reducing valve assembly;
    a pump (65) that feeds pressure fluid into the brake line (42, 43) between the master brake cylinder (12) and the brake pressure modulating first multiposition valve (50);
    said pump (65) is connected on the inlet side to the bypass line (74) between the second multiposition valve (75) and the brake pressure reducing valve assembly (check valve 78) and is switched on upon the occurrence of drive slip;
    an electromagnetically actuable third multiposition valve (70) is disposed between the connection of the bypass line (74) with the brake line (42, 43) at one side of the master brake cylinder (12) and the outlet side of the pump (65); said third multiposition valve (70), upon the occurrence of drive slip is switched out of an open position (70a) into a blocking position (70b) to prevent pressure fluid flow from the pump (65) into the bypass line (74);
    the brake pressure modulating first multiposition valve (50) in the brake line (42, 43) assumes its blocking position (50a) when it is without current, and the second multiposition valve (75) in the bypass line (74) assumes its open position (75a) when it is without current.

2. A brake system as defined in claim 1, in which the one-way check valve (78) has a response pressure of 10 to 30 bar.

3. A brake system as defined in claim 1, in which said one-way check valve (78) has a response pressure of 20 bar.

* * * * *